United States Patent
Kito et al.

(10) Patent No.: US 8,846,779 B2
(45) Date of Patent: *Sep. 30, 2014

(54) ENERGY RAY-CURABLE INK COMPOSITION

(75) Inventors: Katsuyuki Kito, Ibaraki (JP); Masayuki Oya, Ibaraki (JP); Satoshi Kobayashi, Ibaraki (JP)

(73) Assignee: Hitachi Maxell, Ltd., Ibaraki-Shi, Osaka (JP)

( * ) Notice: Subject to any disclaimer, the term of this patent is extended or adjusted under 35 U.S.C. 154(b) by 347 days.

This patent is subject to a terminal disclaimer.

(21) Appl. No.: 12/921,957

(22) PCT Filed: May 15, 2009

(86) PCT No.: PCT/JP2009/059035
§ 371 (c)(1),
(2), (4) Date: Sep. 10, 2010

(87) PCT Pub. No.: WO2009/139454
PCT Pub. Date: Nov. 19, 2009

(65) Prior Publication Data
US 2011/0015294 A1    Jan. 20, 2011

(30) Foreign Application Priority Data

May 16, 2008 (JP) .................. 2008-129814

(51) Int. Cl.
C08F 2/50 (2006.01)
C09D 11/00 (2014.01)
C08J 3/28 (2006.01)
C09D 11/101 (2014.01)
C09D 11/38 (2014.01)

(52) U.S. Cl.
CPC .............. C09D 11/101 (2013.01); C09D 11/38 (2013.01); Y10S 522/909 (2013.01)
USPC .................. 522/153; 522/71; 522/74; 522/81; 522/16; 522/26; 522/909; 522/27; 522/28; 522/14; 522/150; 522/178; 522/182

(58) Field of Classification Search
USPC ......... 106/31.13, 31.6, 31.9; 522/90, 96, 104, 522/113, 114, 120, 121, 74, 71, 28, 26, 27, 522/16, 14, 178, 182, 75, 81, 153, 150, 909
See application file for complete search history.

(56) References Cited

U.S. PATENT DOCUMENTS

| | | | |
|---|---|---|---|
| 6,593,390 B1 | 7/2003 | Johnson et al. | |
| 7,878,642 B2 * | 2/2011 | Takabayashi | 347/100 |
| 8,227,047 B2 * | 7/2012 | Loccufier et al. | 427/466 |
| 2006/0142414 A1 | 6/2006 | Hudd et al. | |
| 2007/0257976 A1 | 11/2007 | Takabayashi | |
| 2008/0124483 A1 | 5/2008 | Takabayashi | |
| 2008/0160209 A1 | 7/2008 | Takabayashi | |

FOREIGN PATENT DOCUMENTS

| | | |
|---|---|---|
| JP | 2001-525479 A | 12/2001 |
| JP | 2003-147233 A | 5/2003 |
| JP | 2006-502257 A | 1/2006 |
| JP | 2006-348204 A | 12/2006 |
| JP | 2007-31667 A | 2/2007 |
| WO | WO 2006/038458 A1 | 4/2006 |
| WO | WO 2006/061979 A1 | 6/2006 |
| WO | WO 2006/062071 A1 | 6/2006 |
| WO | 2007-112970 A | 5/2007 |

OTHER PUBLICATIONS

Data Sheet for Byk-307 for BYK Additive. [online]. Retrieved online on [Feb. 8, 2013]. retrived from internet <URL:http://www.byk.com/en/additives/additives-by-name/byk-307.php>. Dated Nov. 2012.*
International Search Report, dated Aug. 18, 2009 and issued in PCT/JP2009/059035.

* cited by examiner

*Primary Examiner* — Sanza McClendon
(74) *Attorney, Agent, or Firm* — Birch, Stewart, Kolasch & Birch, LLP

(57) ABSTRACT

The present invention provides an energy ray-curable ink composition excellent in the continuous discharge property, and excellent in curability and adherability. The present invention relates to an energy ray-curable ink composition which contains a coloring agent, contains only a monofunctional monomer having an acrylic equivalent of 300 or less, and having one ethylenic double bond in one molecule, and a polyfunctional monomer having an acrylic equivalent of 150 or less, and having two or more ethylenic double bonds in one molecule as a polymerizable compound, contains an α-aminoalkylphenone compound and a thioxanthone compound as a photopolymerization initiator, and contains a silicone compound having a polydimethylsiloxane structure as a surface conditioner.

3 Claims, No Drawings

ENERGY RAY-CURABLE INK COMPOSITION

TECHNICAL FIELD

The present patent application claims a priority of Japanese Patent Application No. 2008-129814, the entirety of which is incorporated herein by reference.

The present invention relates to an energy ray-curable ink composition used in an ink jet recording system.

BACKGROUND ART

Conventionally, as an ink composition applied to an ink jet recording system, an aqueous ink containing water as a main component and an oily ink containing an organic solvent as a main component have been used. A solventless energy ray-curable ink composition which cures an ink by irradiation with an energy ray (e.g. an ultraviolet ray) has been attracting attention in order to suppress blur of a printed material (e.g. Patent Document 1).

As a means to cure the above-described energy ray-curable ink composition, a low pressure mercury lamp, a high pressure mercury lamp, a super-high pressure mercury lamp, a xenon lamp, and a metal halide lamp have been used. However, a polymerizable compound used in the energy ray-curable ink composition generally has low reactivity and, unless an energy ray having a high energy is radiated, it undergoes oxygen inhibition and sufficient curability is not obtained, and therefore there is a problem that adherability is poor. For this reason, for example, an ink composition with improved adherability, and scratch resistance, using monofunctional and polyfunctional monomers, and 50 to 30% by mass of an oligomer as a polymerizable compound has been proposed (e.g. Patent Document 2).

Patent Document 1: JP-A 5-214279
Patent Document 2: JP-A 2001-525479

DISCLOSURE OF THE INVENTION

Problems to be Solved by the Invention

Meanwhile, in the ink jet recording system, since printing is performed by discharging a liquid ink from a nozzle towards a recording medium using pressure, heat or an electric field as a driving source, it is necessary to use an ink having a low viscosity. However, the ink composition containing an oligomer as a polymerizable compound as described above has a high viscosity and, for this reason, there is a problem that phenomena such as nozzle removal, satellite, flight bending, and ink discharge in the mist state are easily caused, and the continuous discharge property is poor. Particularly, in Patent Document 2, since an oligomer having an acrylic equivalent of 180 or more, that is, an oligomer having a large molecular weight is used in order to improve adherability and scratch resistance, the composition easily comes to have high viscosity.

In addition, since heat is easily generated when an ultraviolet ray is radiated by the above-described mercury lamp or metal halide lamp, for example, in the case where a thin film is used as a recording medium, curling or waving is easily generated in the thin film by irradiation with an excessive energy or heat treatment. For this reason, an ink composition having a high curing sensitivity to an energy ray and having good adherability to a recording medium is demanded.

However, since the above-described oligomer having a high acrylic equivalent has low reactivity, a great energy of around 1 J/cm$^2$ is required upon curing, and there is a problem that sufficient curability is not obtained by low energy irradiation. It is also conceivable to use a polyfunctional polymerizable compound having many ethylenic double bonds in order to improve curability and, also in Patent Document 2, combination use of an oligomer and a polyfunctional monomer is proposed. However, when a tri- or more functional polyfunctional monomer is added to an ink composition containing an oligomer, the viscosity of an ink remarkably increases and, therefore, the tri- or more functional polyfunctional monomer must be used in an extremely small amount (paragraph [0015] of Patent Document 2). For this reason, in Patent Document 2, as a specific polymerizable compound, trimethylpropane ethoxylated triacrylate having three ethylenic double bonds is used together with an oligomer, but the content of the polyfunctional monomer is merely 10% by mass. Therefore, when adherability and scratch resistance are intended, the ink composition containing an oligomer as in Patent Document 2 is useful, but there is a problem that when an irradiation means of a low energy is used, such an ink composition cannot satisfy curability and adherability.

The present invention was made in order to solve the above-described problems, and an object thereof is to provide an energy ray-curable ink composition which has a low viscosity and a liquid physical property suitable for an ink jet recording system, and is excellent not only in the continuous discharge property but also in curability and adherability even when an irradiation means of a low energy is used.

Means for Solving the Problems

The present invention is an energy ray-curable ink composition containing a coloring material, a polymerizable compound, a photopolymerization initiator, and a surface conditioner, wherein the polymerizable compound consists only of a monofunctional monomer having an acrylic equivalent of 300 or less, and having one ethylenic double bond in one molecule, and a polyfunctional monomer having an acrylic equivalent of 150 or less, and having two or more ethylenic double bonds in one molecule, the photopolymerization initiator contains an α-aminoalkylphenone compound and a thioxanthone compound, and the surface conditioner contains a silicone compound having a polydimethylsiloxane structure.

Since the ink composition contains the polymerizable compound consisting only of a monofunctional monomer having an acrylic equivalent of 300 or less and a polyfunctional monomer having an acrylic equivalent of 150 or less, a highly reactive ink composition which has a low viscosity suitable for an ink jet recording system can be obtained. In addition, since the ink composition contains the polymerizable compound consisting only of the monofunctional monomer and the polyfunctional monomer and, as a photopolymerization initiator, an α-aminoalkylphenone compound and a thioxanthone compound, an ink composition excellent in curability and adherability can be obtained. In addition, since the ink composition contains the polymerizable compound consisting only of the monofunctional monomer and the polyfunctional monomer and, as a surface conditioner, a silicone compound having a polydimethylsiloxane structure, an ink composition having a liquid physical property suitable for an ink jet recording system can be obtained.

It is preferable that the polymerizable compound contains, as the polyfunctional monomer, a polyfunctional monomer having an acrylic equivalent of 150 or less, and having three or more ethylenic double bonds in one molecule. Since the polyfunctional monomer having three or more ethylenic double bonds in one molecule has high reactivity, an ink composition which is further excellent in curability and adherability can be obtained. In addition, since the polymerizable compound consists only of the monofunctional monomer and the polyfunctional monomer, an increase in the viscosity is small even when the polyfunctional monomer having three or more ethylenic double bonds in one molecule is contained.

In addition, it is preferable that the polymerizable compound contains, as the polyfunctional monomer, a polyfunctional monomer having an acrylic equivalent of 150 or less, and having two ethylenic double bonds in one molecule, and a polyfunctional monomer having an acrylic equivalent of 150 or less, and having three or more ethylenic double bonds in one molecule. When the polyfunctional monomer having two ethylenic double bonds in one molecule, and the polyfunctional monomer having three or more ethylenic double bonds in one molecule are used together, all of a low viscosity, and curability and adherability can be realized at a higher level.

As the monofunctional monomer, at least one kind selected from the group consisting of isooctyl (meth)acrylate, 2-ethylhexyl (meth)acrylate, and tridecyl (meth)acrylate is preferable and, as the polyfunctional monomer, at least one kind selected from the group consisting of 1,6-hexanediol di(meth)acrylate, dipropylene glycol di(meth)acrylate, pentaerythritol tri(meth)acrylate, and dipentaerythritol hexa(meth)acrylate is preferable. Since the monofunctional monomer has a low viscosity, and the polyfunctional monomer has a low molecular weight and has many ethylenic double bonds in one molecule, the composition has a low viscosity and high reactivity. For this reason, when the monomers are used as the polymerizable compound, an ink composition which has a lower viscosity and is excellent in curability and adherability can be obtained.

It is preferable that the silicone compound which is a surface conditioner has an ethylenic double bond in the molecule. Since the silicone compound has reactivity, curability and adherability can be further improved.

The ink composition may further contain a hindered amine compound having a 2,2,6,6-tetramethylpiperidinyl group as an antigelling agent. In the ink composition, polymerization is easily initiated by heat or light at storage due to inclusion of monomers having high reactivity, or a photopolymerization initiator and, for this reason, storage stability is easily reduced. However, when these monomers and the photopolymerization initiator, and the hindered amine compound are used together, an ink composition excellent in curability and adherability can be obtained while maintaining storage stability.

In addition, according to the ink composition, an ink composition having a low viscosity suitable for an ink jet recording system at 4 to 35 mPa·s (25° C.) can be obtained and, at the same time, an ink composition excellent in curability and adherability even by irradiation with an energy at a low integral light quantity of 200 mJ/cm$^2$ or less can be obtained.

Particularly, in the ink composition, it is preferable that the content of the monofunctional monomer is 10 to 20% by mass, the content of the polyfunctional monomer is 10 to 75% by mass, the content of the α-aminoalkylphenone compound is 2 to 20% by mass, the content of the thioxanthone compound is 0.1 to 10% by mass, and the content of the silicone compound is 2.5% by mass or less based on the total amount of the ink composition, and a mass ratio of the content of the monofunctional monomer and the content of the polyfunctional monomer (polyfunctional monomer/monofunctional monomer) is 3 to 8.

Further, when the polymerizable compound contains, as the polyfunctional monomer, a polyfunctional monomer having an acrylic equivalent of 150 or less, and having three or more ethylenic double bonds in one molecule, it is preferable that 10 to 50% by mass of the polyfunctional monomer is contained based on the total amount of the ink composition.

In addition, when the polymerizable compound contains, as the polyfunctional monomer, a polyfunctional monomer having an acrylic equivalent of 150 or less, and having two ethylenic double bonds in one molecule, and a polyfunctional monomer having an acrylic equivalent of 150 or less, and having three or more ethylenic double bonds in one molecule, it is preferable that 10 to 60% by mass, and 10 to 50% by mass of the monomers are contained, respectively, based on the total amount of the ink composition, and that the total content of them is 20 to 75% by mass.

Effects of the Invention

As described above, according to the present invention, it is possible to provide an energy ray-curable ink composition which has a low viscosity and a liquid physical property suitable for an ink jet recording system, and is excellent not only in the continuous discharge property, but also in curability and adherability even when an irradiation means of a low energy is used.

BEST MODE FOR CARRYING OUT THE INVENTION

In the present invention, an ink composition contains, as a polymerizable compound, only a monofunctional monomer having an acrylic equivalent of 300 or less, and having one ethylenic double bond in one molecule, and a polyfunctional monomer having an acrylic equivalent of 150 or less, and having two ethylenic double bonds in one molecule. Since the polymerizable compound of the present invention is composed only of the above-described monomers and does not contain oligomers, an ink composition which has a low viscosity and is excellent in curability can be obtained. In addition, when the polymerizable compound should have high reactivity, it is also conceivable to use only a polyfunctional monomer, but in this case, the continuous discharge property deteriorates due to an increase in the viscosity. On the other hand, when the polymerizable compound should have a low viscosity, it is also conceivable to use only a monofunctional monomer, but in this case, reactivity is reduced and, for this reason, curability and adherability deteriorate. For this reason, it is conceivable to use the polymerizable compound using both of the monofunctional monomer and the polyfunctional monomer, but mere combination use of these monomers hardly reduces the viscosity of the ink composition to a viscosity suitable for an ink jet recording system, and curability and adherability become insufficient. The present inventors paid attention to the acrylic equivalent of each monomer from the viewpoint of the viscosity and reactivity, and found out that by composing a polymerizable compound consisting only of a monofunctional monomer and a polyfunctional monomer each having acrylic equivalents restricted within a certain range, it is possible to obtain an ink composition having a viscosity of 4 to 35 mPa·s, having no problem in the continuous discharge property even when used in printing by an ink jet recording system, and exhibiting excellent curability and adherability even by irradiation with a low energy at an integral light quantity of 200 mJ/cm² or less. That is, the acrylic equivalent is an index expressed by (molecular weight/number of acrylic groups in one molecule) and, in the case of monomers having a same molecular weight, monomers having a lower acrylic equivalent have more acrylic groups in one molecule. In addition, even in the case of monomers having a same number of acrylic groups, as the molecular weight is lower, the acrylic equivalent becomes higher. Therefore, monomers having a lower acrylic equivalent have more crosslinking points in the molecule and have high reactivity, and monomers having a higher acrylic equivalent have lower reactivity and have a higher molecular weight, and therefore they tend to increase in the viscosity. From the above viewpoint, each acrylic equivalent when a monofunctional monomer and polyfunctional monomer are used together was studied and, as a result, it was found that, when a polymerizable compound is composed only of a monofunctional monomer having an acrylic equivalent of 300 or less, preferably 130 or more and 255 or less, and a polyfunctional monomer having an acrylic equivalent of 150 or less, preferably 85 or more and 150 or less, an ink composition realizing both of a low viscosity and high reactivity is obtained. When an acrylic equivalent of a monofunctional monomer is higher than 300, the molecular weight becomes high and the viscosity is easily increased and, even when a polyfunctional monomer having an acrylic equivalent of 150 or less is used together, the continuous discharge property deteriorates. On the other hand, when an acrylic equivalent of a polyfunctional monomer is higher than 150, curability and adherability deteriorate with radiation at a low energy due to a decrease in the number of acrylic groups, even when a monofunctional monomer having an acrylic equivalent of 300 or less is used together. In addition, in the present invention, the polymerizable compound consisting only of a monofunctional monomer and a polyfunctional monomer means a polymerizable compound which does not contain, or does not substantially contain a polymerizable compound having a higher acrylic equivalent than each acrylic equivalent, and does not exclude a polymerizable compound containing monomers or oligomers having a high acrylic equivalent, which are unavoidably contained as impurities in production or storage of the monomers, at a low concentration.

Specific examples of the monofunctional monomer having one ethylenic double bond in one molecule include amyl (meth)acrylate, isoamyl (meth)acrylate, octyl (meth)acrylate, isooctyl (meth)acrylate, decyl (meth)acrylate, isodecyl (meth)acrylate, lauryl (meth)acrylate, isomyristyl (meth)acrylate, 2-ethylhexyl (meth)acrylate, tridecyl (meth)acrylate, 2-ethylhexyl-diglycol (meth)acrylate, 2-(meth)acryloyloxyethylhexahydrophthalic acid, neopentyl glycol (meth)acrylic acid benzoic acid ester, butoxyethyl (meth)acrylate, ethoxy-diethylene glycol (meth)acrylate, methoxy-triethylene glycol (meth)acrylate, methoxy-polyethylene glycol (meth)acrylate, methoxydipropylene glycol (meth)acrylate, phenoxyethyl (meth)acrylate, phenoxy-polyethylene glycol (meth)acrylate, nonylphenol ethylene oxide adduct (meth)acrylate, tetrahydrofurfuryl (meth)acrylate, isobonyl (meth)acrylate, 2-hydroxyethyl (meth)acrylate, 2-hydroxypropyl (meth)acrylate, 2-hydroxybutyl (meth)acrylate, 2-hydroxy-3-phenoxypropyl (meth)acrylate, 2-(meth)acryloyloxyethyl-succnic acid, 2-(meth)acryloyloxyethyl-phthalic acid, and 2-(meth)acryloyloxyethyl-2-hydroxyethyl-phthalic acid. These may be used alone, or by mixing a plurality of them. Alternatively, the monomer may be substituted with a functional group such as phosphorus or fluorine. Among them, isooctyl (meth)acrylate, 2-ethylhexyl (meth)acrylate, and tridecyl (meth)acrylate have a low viscosity and, therefore, they are particularly preferable.

Specific examples of the polyfunctional monomer having two ethylenic double bonds in one molecule include 1,3-butylene glycol di(meth)acrylate, 1,4-butylene glycol di(meth)acrylate, diethylene glycol di(meth)acrylate, 1,6-hexanediol di(meth)acrylate, neopentyl glycol di(meth)acrylate, triethylene glycol di(meth)acrylate, tripropylene glycol diacrylate, cyclohexanedimethanol di(meth)acrylate, and dipropylene glycol di(meth)acrylate. These may be used alone, or by mixing a plurality of them.

Specific examples of the polyfunctional monomer having three ethylenic double bonds in one molecule include trimethylolpropane tri(meth)acrylate, pentaerythritol tri(meth)acrylate, tris(2-hydroxyethyl)isocyanurate tri(meth)acrylate, glyceryl tri(meth)acrylate, and modified products of these monomers with ethylene oxide, propylene oxide, and caprolactone. These may be used alone, or by mixing a plurality of them.

Specific examples of the polyfunctional monomer having four ethylenic double bonds in one molecule include ditrimethylolpropane tetra(meth)acrylate, pentaerythritol tetra(meth)acrylate, and modified products of these monomers with ethylene oxide, propylene oxide, and caprolactone. These may be used alone, or by mixing a plurality of them.

Specific examples of the polyfunctional monomer having five ethylenic double bonds in one molecule include dipentaerythritol hydroxypenta(meth)acrylate, and modified products thereof with ethylene oxide, propylene oxide, or caprolactone. These may be used alone, or by mixing a plurality of them.

Specific examples of the polyfunctional monomer having six ethylenic double bonds in one molecule include dipentaerythritol hexa(meth)acrylate, and modified products thereof with ethylene oxide, propylene oxide, or caprolactone. These may be used alone, or by mixing a plurality of them.

Among the polyfunctional monomers, a higher polyfunctional monomer having three or more ethylenic double bonds in one molecule is preferable, and combination use of a difunctional monomer having two ethylenic double bonds in one molecule, and a higher polyfunctional monomer having three or more ethylenic bonds in one molecule is more preferable. By using a higher polyfunctional monomer having three or more ethylenic double bonds in one molecule, an ink composition further excellent in curability and adherability can be obtained. In addition, by using a difunctional monomer and a higher polyfunctional monomer together, all of the low viscosity, curability and adherability can be realized at a higher level. When a difunctional monomer and a higher polyfunctional monomer are used together, as the difunctional monomer, at least one kind selected from the group consisting of 1,6-hexanediol di(meth)acrylate, and dipropylene glycol di(meth)acrylate is preferable and, as the higher polyfunctional monomer, at least one kind selected from the group consisting of dipropylene glycol di(meth)acrylate, pentaerythritol tri(meth)acrylate, and dipentaerythritol hexa (meth)acrylate is preferable.

The content of the polymerizable compound in the ink composition is preferably 20 to 90% by mass, more preferably 70 to 88% by mass relative to the whole composition. When the content is within the above range, an ink composition having high curability and adherability can be obtained while a low viscosity is maintained. In addition, the content of the monofunctional monomer is preferably 10 to 20% by mass, more preferably 10 to 15% by mass relative to the whole composition. When the content of the monofunctional monomer is 10% by mass or more, an ink composition having a lower viscosity can be obtained. On the other hand, when the content of the monofunctional monomer is 20% by mass or less, since a large amount of the polyfunctional monomer having high reactivity can be contained, curability and adherability can be further improved. The content of the polyfunctional monomer is preferably 10 to 75% by mass, more preferably 58 to 75% by mass relative to the whole composition. When the content of the polyfunctional monomer is 10% by mass or more, since a large amount of the polyfunctional monomer having high reactivity is contained, curability and adherability can be improved. On the other hand, when the content of the polyfunctional monomer is 75% by mass or less, reduction in storage stability can be suppressed. When a difunctional monomer having two ethylenic double bonds in one molecule, and a higher polyfunctional monomer having three or more ethylenic double bonds in one molecule are used together as polyfunctional monomers, the total content of the polyfunctional monomers is preferably 20 to 75% by mass, more preferably 58 to 70% by mass. In addition, in this case, the content of the difunctional monomer is preferably 10 to 60% by mass, more preferably 19 to 60% by mass relative to the whole composition, and the content of the higher polyfunctional monomer is preferably 10 to 50% by mass, more preferably 30 to 50% by mass relative to the whole composition. Since the polymerizable compound of the present invention consists only of the monofunctional monomer and the polyfunctional monomer, even when a large amount of the higher polyfunctional monomer is contained as described above, an ink composition having a low viscosity can be obtained. Further, a ratio of the monofunctional monomer and the polyfunctional monomer in the polymerizable compound is preferably 3 to 8 as expressed by a mass ratio of the content of the monofunctional monomer and the content of the polyfunctional monomer (polyfunctional monomer/monofunctional monomer). When the ratio is within the above range of the mass ratio, the viscosity, curability and adherability can be optimized.

In the present invention, the ink composition contains an α-aminoalkylphenone compound and a thioxanthone compound as a photopolymerization initiator in order to initiate polymerization at a low energy Specific examples of the α-aminoalkylphenone compound include 2-methyl-1[4-(methylthio)phenyl]-2-morpholinopropane-1-one, and 2-benzyl-2-dimethylamino-1-(4-morpholinophenyl)butanone-1,2-methyl-1-[4-(methoxythio)-phenyl]-2-morpholinopropane-2-one. These may be used alone, or by mixing a plurality of them. Examples of the commercially available α-aminoalkylphenone compound include Irgacure 369, and Irgacure 907 manufactured by Ciba. The content of the α-aminoalkylphenone compound in the ink composition is preferably 2 to 20% by mass relative to the whole composition.

Specific examples of the thioxanthone compound include thioxanthone, 2-methylthioxanthone, 2-ethylthioxanthone, 2-isopropylthioxanthone, 4-isopropylthioxanthone, 2-chlorothioxanthone, 2,4-dimethylthioxanthone, 2,4-diethylthioxanthone, 2,4-dichlorothioxanthone, and 1-chloro-4-propoxythioxanthone. These may be used alone, or by mixing a plurality of them. Examples of the commercially available thioxanthone compound include KAYACURE DETX-S manufactured by Nippon Kayaku Co., Ltd., and Chivacure ITX manufactured by Double Bond Chemical. The content of the thioxanthone compound in the ink composition is preferably 0.1 to 10% by mass relative to the whole composition. In addition, it is preferable that, in the total amount of the photopolymerization initiator, 40 to 99% by mass of the α-aminoalkylphenone compound and 1 to 60% by mass of the thioxanthone compound are contained. When the photopolymerization initiator containing the α-aminoalkylphenone compound and the thioxanthone compound within the above ranges is used, an ink composition further excellent in curability and adherability can be obtained.

The ink composition may further contain conventionally publicly known photopolymerization initiators such as aryl alkyl ketone, oxime ketone, acylphosphine oxide, acyl phosphonate, S-phenyl thiobenzoate, titanocene, aromatic ketone, benzil, quinone derivatives, and ketocoumarins, in addition to the α-aminoalkylphenone compound and the thioxanthone compound. Specific examples of these photopolymerization initiators include bis(2,4,6-trimethylbenzoyl)-phenylphosphine oxide, 1-hydroxy-cyclohexyl-phenyl-ketone, 2,2-dimethoxy-1,2-diphenylethane-1-one, 1,2-octanedione-[4-(phenylthio)-2-(o-benzoyloxime)], bis(2,6-dimethoxybenzoyl)-2,4,4-trimethyl-pentylphosphine oxide, and 2,4,6-trimethylbenzoyl-phosphine oxide. The amount of these photopolymerization initiators in the ink composition is preferably 0.5 to 10% by mass relative to the whole composition.

In the present invention, the ink composition contains a silicone compound having a polydimethylsiloxane structure as a surface conditioner. When the silicone compound as a surface conditioner is used with the polymerizable compound, liquid physical properties such as a surface tension of the ink composition can be adjusted within a range suitable for an ink jet recording system.

Specific examples of the silicone compound include BYK-300, BYK-302, BYK-306, BYK-307, BYK-310, BYK-315, BYK-320, BYK-322, BYK-323, BYK-325, BYK-330, BYK-331, BYK-333, BYK-337, BYK-344, BYK-370, BYK-375, BYK-377, BYK-UV3500, BYK-UV3510 and BYK-UV3570 manufactured by BYK-Chemie, Tego-Rad2100, Tego-Red2200N, Tego-Rad2250, Tego-Rad2300, Tego-Rad2500, Tego-Rad2600 and Tego-Rad2700 manufactured by Degussa, and Glanol 100, Glanol 115, Glanol 400, Glanol 410, Glanol 435, Glanol 440, Glanol 450, B-1484, Polyflow ATF-2. KL-600, UCR-L72, and UCR-L93 manufactured by Kyoeisha Chemical Co., Ltd. These may be used alone, or by mixing a plurality of them. Among them, BYK-UV3500, BYK-UV3510, and BYK-UV3570 manufactured by BYK-Chemie, Tego-Rad2100, Tego-Rad2200N, Tego-Rad2250, Tego-Rad2300, Tego-Rad2500, Tego-Rad2600, and Tego-Rad2700 manufactured by Degussa, and UCR-L72 and UCR-L93 manufactured by Kyoeisha Chemical Co., Ltd. are preferable. Since these contain a polydimethylsiloxane structure having an ethylenic double bond in the molecule, they can further improve adherability.

The content of the silicone compound in the ink composition is preferably 2.5% by mass or less, more preferably 0.1 to 2.5% by mass or less relative to the whole composition. When the content of the silicone compound is more than 2.5% by mass, an undissolved portion of the silicone compound may be generated or foaming may be caused.

The ink composition may contain conventionally publicly known surface conditioners in addition to the above-described silicone compound. Specific examples of the surface conditioners include Emulgen manufactured by Kao Corporation.

In the present invention, there may be used in the ink composition conventionally publicly known various dyes as a coloring material and, from the viewpoint of weather resistance, it is preferable that either or both of an inorganic pigment and an organic pigment are used.

Specific examples of the inorganic pigment include titanium oxide, zinc flower, zinc oxide, lithopone, iron oxide, aluminum oxide, silicon dioxide, kaolinite, montmorillonite, talc, barium sulfate, calcium carbonate, silica, alumina, Cadmium Red, colcothar, Molybdenum Red, Chrome vermillion, Molybdate Orange, chrome yellow, Chrome Yellow, Cadmium Yellow, yellow iron oxide, Titan Yellow, chromium oxide, viridian, Cobalt Green, Titanium Cobalt Green, Cobalt Chrome Green, ultramarine, Ultramarine Blue, Prussian blue, Cobalt Blue, Cerulean Blue, Manganese Violet, Cobalt Violet, and mica.

Specific examples of the organic pigment include azo, azomethine, polyazo, phthalocyanine, quinacridone, anthraquinone, indigo, thioindigo, quinophthalone, benzimidazolone, and isoindoline organic pigments. Alternatively, carbon black consisting of acidic, neutral or basic carbon may be used. Furthermore, a hollow particle of a crosslinked acrylic resin may be used as an organic pigment.

Specific examples of the pigment having a cyan color include C.I. Pigment Blue 1, C.I. Pigment Blue 2, C.I. Pigment Blue 3, C.I. Pigment Blue 15:3, C.I. Pigment Blue 15:4, C.I. Pigment Blue 16, C.I. Pigment Blue 22, and C.I. Pigment Blue 60. Among them, from the viewpoint of weather resistance and coloring power, either or both of C.I. Pigment Blue 15:3 and C.I. Pigment Blue 15:4 are preferable.

Specific examples of the pigment having a magenta color include C.I. Pigment Red 5, C.I. Pigment Red 7, C.I. Pigment Red 12, C.I. Pigment Red 48 (Ca), C.I. Pigment Red 48 (Mn), C.I. Pigment Red 57 (Ca), C.I. Pigment Red 57:1, C.I. Pigment Red 112, C.I. Pigment Red 122, C.I. Pigment Red 123, C.I. Pigment Red 168, C.I. Pigment Red 184, C.I. Pigment Red 202, C.I. Pigment Red 209, C.I. Pigment Red 254, and C.I, Pigment Violet 19. Among them, from the viewpoint of weather resistance and coloring power, at least one kind selected from the group consisting of C.I. Pigment Red 122, C.I. Pigment Red 202, C.I. Pigment Red 209, C.I. Pigment Red 254, and C.I. Pigment Violet 19 is preferable.

Specific examples of the pigment having a yellow color include C.I. Pigment Yellow 1, C.I. Pigment Yellow 2, C.I. Pigment Yellow 3, C.I. Pigment Yellow 12, C.I. Pigment Yellow 13, C.I. Pigment Yellow 14C, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 109, C.I. Pigment Yellow 110, C.I. Pigment Yellow 114, C.I. Pigment Yellow 120, C.I. Pigment Yellow 128, C.I. Pigment Yellow 129, C.I. Pigment Yellow 130, C.I. Pigment Yellow 138, C.I. Pigment Yellow 139, C.I. Pigment Yellow 147, C.I. Pigment Yellow 150, C.I. Pigment Yellow 151, C.I. Pigment Yellow 154, C.I. Pigment Yellow 155, C.I. Pigment Yellow 180, C.I. Pigment Yellow 185, C.I. Pigment Yellow 213, and C.I. Pigment Yellow 214. Among them, from the viewpoint of weather resistance, at least one kind selected from the group consisting of C.I. Pigment Yellow 74, C.I. Pigment Yellow 83, C.I. Pigment Yellow 109, C.I. Pigment Yellow 110, C.I. Pigment Yellow 120, C.I. Pigment Yellow 128, C.I. Pigment Yellow 138, C.I. Pigment Yellow 139, C.I. Pigment Yellow 150, C.I. Pigment Yellow 151, C.I. Pigment Yellow 154, C.I. Pigment Yellow 155, C.I. Pigment Yellow 213, and C.I. Pigment Yellow 214 is preferable.

Specific examples of the pigment having a black color include HCF, MCF, RCF, LFF and SCF manufactured by Mitsubishi Chemical Corporation; Monarch and Regal manufactured by Cabot; Color Black, Special Black, and Printex manufactured by Degussa-Huels; Toka Black manufactured by Tokai Carbon Co., Ltd.; and Raven manufacture by Columbia. Among them, at least one kind selected from the group consisting of HCF#2650, HCF#2600, HCF#2350, HCF#2300, MCF#1000, MCF#980, MCF#970, MCF#960, MCF88, LFFMA7, MA8, MA11, MA77, and MA100 manufactured by Mitsubishi Chemical Corporation, and Printex 95, Printex 85, Printex 75, Printex 55, and Printex 45 manufactured by Degussa Huels is preferable.

The content of the coloring material in the ink composition is preferably 1 to 10% by mass, more preferably 2 to 7% by weight, most preferably 3 to 6% by mass relative to the whole composition. When the content of the coloring material is too small, there is a tendency that image coloring power is reduced. On the other hand, when the content of the coloring material is too large, the viscosity of the ink composition is increased and flowability tends to be lost.

When a pigment is used as the coloring material, a pigment derivative and a pigment dispersant may be further used in order to improve dispersibility of the pigment. Specific examples of the pigment derivative include a pigment derivative having a dialkylaminoalkyl group, and a pigment derivative having a dialkylaminoalkylsulfonic acid amide group. Specific examples of the pigment dispersant include ionic or nonionic surfactants, and anionic, cationic or nonionic polymer compounds. Among them, from the viewpoint of dispersion stability, a polymer compound having a cationic group or an anionic group is preferable. Examples of the commercially available pigment dispersant include SOLSPERSE manufactured by Lubrizol, DISPERBYK manufactured by BYK-Chemie, and EFKA manufactured by EFKA Additives. The contents of the pigment derivative and the pigment dispersant in the ink composition are preferably 0.05 to 5% by mass relative to the whole composition, respectively.

It is preferable that the ink composition of the present invention further contains a hindered amine compound having a 2,2,6,6-tetramethylpiperidinyl group as an antigelling agent. When the hindered amine compound is used as an antigelling agent together with the highly reactive polymerizable compound and the photopolymerization initiator, an ink composition excellent in storage stability can be obtained without reducing reactivity of the ink composition. Specific examples of the antigelling agent include bis(1-oxyl-2,2,6,6-tetramethylpiperidin-4-yl) sebacate, and bis(2,2,6,6-tetramethyl-1-(octyloxy)-4-piperidinyl) decanedioate. These may be used alone, or by mixing a plurality of them. Among them, bis(1-oxyl-2,2,6,6-tetramethylpiperidin-4-yl) sebacate is preferable. Examples of the commercially available antigelling agent include IRGASTAB UV-10 and TINUVIN 123 manufactured by Ciba.

The content of the antigelling agent in the ink composition is preferably 0.01 to 3% by mass, more preferably 0.1 to 2% by mass relative to the whole composition. When the content of the antigelling agent is less than 0.01% by mass, a radical generated at storage cannot be sufficiently captured, and there is a tendency that storage stability is reduced. On the other hand, when the content of the antigelling agent is more than 3% by mass, there is a tendency that the effect of capturing a radical is saturated and, at the same time, a polymerization reaction during energy ray irradiation is inhibited.

The ink composition may further contain, as the antigelling agent, other hindered amine compounds, phenol antioxidants, phosphorus antioxidants, and hydroquinone monoalkyl ethers. Specific examples of the antigelling agent include hydroquinone monomethyl ether, hydroquinone, t-butylcatechol, pyrogallol, and TINUVIN 111 FDL, TINUVIN 144, TINUVIN 292, TINUVIN XP40, TINUVIN XP60, and TINUVIN 400 manufactured by Ciba. The content of these antigelling agents in the ink composition is preferably 0.1 to 4% by mass relative to the whole composition.

The ink composition of the present invention may further contain, as an optional component, publicly known general additives such as a surfactant, a leveling agent, an anti-foaming agent, an antioxidant, a pH adjusting agent, a charge imparting agent, a bactericidal agent, an antiseptic agent, a deodorant, a charge adjusting agent, a wetting agent, an anti-skinning agent, and a perfume, if necessary.

As a method of preparing the ink composition, conventionally publicly known preparation methods can be used, but when a pigment is used as a coloring agent, the following preparation method is preferable.

First, a mixed solution obtained by pre-mixing a coloring agent, a part of a polymerizable compound and, if necessary, a pigment dispersant is prepared, and this mixed solution is dispersed by a dispersing machine to prepare a primary dispersion. Specific examples of the dispersing machine include a disper; container driving medium mills such as a ball mill, a centrifugation mill, and a planetary ball mill; high speed rotating mills such as a sand mill; and medium stirring mills such as a stirring tank-type mill.

Then, the remaining polymerizable compound, a photopolymerization initiator, a surface conditioner and, if necessary, other additives such as an antigelling agent are added to the primary dispersion, and these are uniformly mixed using a stirrer. Specific examples of the stirrer include a three-one motor, a magnetic stirrer, a disper, and a homogenizer. Alternatively, the ink composition may be mixed using a mixing machine such as a line mixer. Further, for the purpose of further finely-dividing particles in the ink composition, the ink composition may be mixed using a dispersing machine such as a bead mill or a high pressure jet mill.

When a pigment is used as a coloring material, the dispersion average particle diameter of pigment particles in the ink composition is preferably 20 to 200 nm, more preferably 50 to 160 nm. When the dispersion average particle diameter is less than 20 nm, since the particle is fine, there is a tendency that weather resistance of a printed material is reduced. On the other hand, when the dispersion average particle diameter is more than 200 nm, there is a tendency that fineness of a printed material is reduced.

According to the present invention, since the polymerizable compound is composed only of a monofunctional monomer having an acrylic equivalent of 300 or less, and having one ethylenic double bond in one molecule, and a polyfunctional monomer having an acrylic equivalent of 150 or less, and having two or more ethylenic double bonds in one molecule, an ink composition having a low viscosity of 4 to 35 mPa·s at 25° C. can be prepared. In addition, since the polymerizable compound and, as a surface conditioner, a silicone compound having a polydimethylsiloxane structure are contained, an ink composition suitable for an ink jet recording system having a surface tension of 20 to 40 mN/m can be prepared. For this reason, in the ink composition of the present invention, phenomena such as nozzle removal, satellite, flight bending, and ink discharge in the mist state hardly occur, and the continuous discharge property is excellent.

In addition, the ink composition of the present invention needs not be diluted with a diluting solvent, has a low viscosity even when the composition is not warmed, and further, is good in pigment dispersibility when the coloring material is a pigment, and has such good dispersion stability that the viscosity does not increase during storage or during use, and disadvantages such as sedimentation of a pigment are not caused. For this reason, in an ink jet recording system, stable discharge is achieved at room temperature without warming an ink.

The ink jet recording system is not particularly limited, and examples thereof include a charge controlling system of discharging an ink utilizing an electrostatic attraction force, a drop on demand system (pressure pulse system) utilizing a vibration pressure of a piezo element, an acoustic ink jet recording system utilizing a radiation pressure which converts an electric signal into an acoustic beam and radiates the beam to an ink, and a thermal ink jet recording system of heating an ink to form bubbles and utilizing the generated pressure. In addition, the ink jet recording system includes a system of injecting an ink of a low concentration called photoink in a fine volume and in a large number, a system of improving image quality using a plurality of inks having substantially the same hue and different concentrations, and a system using a colorless transparent ink.

In the present invention, examples of an irradiation means include an ultraviolet-ray irradiation means such as a mercury lamp or a metal halide lamp. In the case of the ink composition of the present invention, a low energy of 200 mJ/cm$^2$ or less can also be utilized as an integral light quantity of an ultraviolet ray. It is preferable that the ink composition is irradiated with an energy ray until 1 to 1,000 ms passes after the ink composition is discharged onto a recording medium. When the elapsed time is less than 1 ms, the distance between a head and a light source is too short, and the head is irradiated with an energy ray, leading to an unforeseen situation. On the other hand, when the elapsed time exceeds 1,000 ms, there is a tendency that image quality deteriorates due to ink blur when many colors are utilized.

The present invention will be explained more specifically below based on examples, but the present invention is not limited to these examples. Hereinafter, "part" means "part by mass".

EXAMPLES

Components of ink compositions used in respective examples and comparative examples are shown in the following Table 1. Indication of ink compositions of Tables 2 to 6 shows the same composition as that of the indication in parenthes in the "kind" column in Table 1.

TABLE 1

| Component | Kind | Trade name • specification |
|---|---|---|
| Coloring material | Acidic carbon black pigment (MA8) | Mitsubishi Chemical Corporation, MA-8 |
| | Nickel azo pigment (LA2) | LA-2 manufactured by Ciba |
| | Quinacridone pigment (RT343D) | CINQUASIA Magenda RT-343-D manufactured by Ciba |
| | Copper phthalocyanine pigment (P-BFS) | HOSTAPERM BLUE P-BFS manufactured by Clariant |
| Pigment dispersant | Comb copolymer having basic functional group (BYK168) | DISPERBYK168 manufactured by BYK-Chemie |

TABLE 1-continued

| Component | | Kind | Trade name • specification |
|---|---|---|---|
| Polymerizable compound | Monofunctional monomer | Isooctyl acrylate (IO-A) | Sartomer SR440 (acrylic equivalent: 184, ethylenic double bond/1 per molecule) manufactured by Sartomer |
| | | 2-Methoxyethyl acrylate (2-MTA) | 2-MTA (acrylic equivalent: 130, ethylenic double bond/1 per molecule) manufactured by Osaka Organic Chemical Industry Ltd. |
| | | Tridecyl acrylate (TA) | Sartomer SR489D (acrylic equivalent: 255, ethylenic double bond/1 per molecule) manufactured by Sartomer |
| | | Stearyl acrylate (STA) | STA (acrylic equivalent: 325, ethylenic double bond/1 per molecule) manufactured by Osaka Organic Chemical Industry Ltd. |
| | Polyfunctional monomer | 1,6-Hexadiol diacrylate (HDDA) | Sartomer SR238F (acrylic equivalent: 113, ethylenic double bond/2 per molecule) manufactured by Sartomer |
| | | Dipropylene glycol diacrylate (DPGDA) | Sartomer SR508 (acrylic equivalent: 121, ethylenic double bond/2 per molecule) manufactured by Sartomer |
| | | Trimethylolpropane triacrylate (TMPTA) | Sartomer SR351S (acrylic equivalent: 99, ethylenic double bond/3 per molecule) manufactured by Sartomer |
| | | Pentaerythritol triacrylate (PE-3A) | Light Acrylate PE-3A (acrylic equivalent: 99, ethylenic double bond/3 per molecule) manufactured by Kyoeisha Chemical Co., Ltd. |
| | | Dipentaerythritol hexaacrylate (DPHA) | Light Acrylate DP11-6A (acrylic equivalent: 96, ethylenic double bond/6 per molecule) manufactured by Kyoeisha Chemical Co., Ltd. |
| | | Pentaerythritol tetraacrylate (PETA) | Sartomer SR296 (acrylic equivalent: 88, ethylenic double bond/4 per molecule) manufactured by Sartomer |
| | | Ethoxylated trimethylolpropane triacrylate (EO-TMPTA) | Sartomer SR454 (acrylic equivalent: 143, ethylenic double bond/3 per molecule) manufactured by Sartomer |
| | | Propoxylated neopentyl glycol diacrylate (PO-NPA) | Sartomer SR9003 (acrylic equivalent: 164, ethylenic double bond/2 per molecule) manufactured by Sartomer |
| | Oligomer | Urethane acrylate oligomer (ACTILANE251) | ACTILANE251 (acrylic equivalent: 180, ethylenic double bond/3 per molecule) manufactured by Across |
| Photopolymerization initiator | | 2-Methyl-1-[4-(methylthio)phenyl]-2-morpholinopropane-1-one (1R,907) | IRGACURE907 (α-aminoalkylphenone) manufactured by Ciba |
| | | 2-Benzyl-2-dimethylamino-1-(4-morpholino-phenyl)-butanone (1R,369) | IRGACURE369 (α-aminoalkylphenone) manufactured by Ciba |
| | | Diethylthioxanthone (DETX-S) | DETX-S (thioxanthone) manufactured by Nippon Kayaku Co., Ltd. |
| | | Isopropylthioxanthone (IT-X) | Chivacure ITX (thioxanthone) manufactured Double Bond Chemical |
| | | 2,2-Dimethoxy-1,2-diphenylethane-1-one (IR,651) | IRGACURE651 (benzylketal) manufactured by Ciba |
| Surface conditioner | | Polydimethylsiloxane having polyether-modified acrylic group (BYK-UV3570) | BYK-UV3570 manufactured by BYK-Chemie |
| | | Silicone acrylate having polydimethylsiloxane structure (TegoRad2100) | TEGO Rad2100 manufactured by Degussa |
| | | Silicone polyether acrylate having polydimethyl-siloxane structure (TegoRad2200N) | TEGO Rad2200N manufactured by Degussa |
| | | Polyether-modified polydimethylsiloxane (KF-945) | KF-945 manufactured by Dow Corning |
| | | Polyoxyethylene lauryl ether (Emulgen 106) | Emulgen 106 manufactured by Kao Corporation |
| Antigelling agent | | Bis(1-oxyl-2,2,6,6-tetramethylpiperidin-4-yl) sebacate (UV10) | IRGASTAB UV10 (hindered amine) manufactured by Ciba |
| | | Benzotriazole antigelling agent (TIN400) | TINUVIN 400 (benzotriazole) manufactured by Ciba |

[Preparation of Ink Composition]

A coloring material, a pigment dispersant, and a monofunctional monomer were weighed into a 100 cc plastic bottle in blending amounts shown in Tables 2 to 6, 100 parts of zirconia beads were added thereto, and the materials were dispersed by a paint conditioner (manufactured by Toyo Seiki) for 2 hours to obtain a primary dispersion. Then, the remaining components were added to the resulting primary dispersion in blending amounts shown in Tables 2 to 6, and the mixture was stirred using a magnetic stirrer for 30 minutes. After stirring, the mixture was filtered by suction using a glass filter (manufactured by Kiriyama Glass) to prepare an ink composition. In Comparative Example 15, an ink composition was prepared similarly to the above except that a primary dispersion was made using 1,6-hexanediol diacrylate in place of a monofunctional monomer.

TABLE 2

| Ink composition | | | | Example 1 | Example 2 | Example 3 | Example 4 | Example 5 |
|---|---|---|---|---|---|---|---|---|
| Coloring material | | MA-8 | (Part) | 3 | — | — | — | 3 |
| | | LA2 | (Part) | — | 3 | — | — | — |
| | | RT343D | (Part) | — | — | 3 | — | — |
| | | P-BFS | (Part) | — | — | — | 3 | — |
| Polymerizable compound | Monofunctional monomer | IO-A | (Part) | 12.5 | 12.5 | 12.5 | 12.5 | 12.5 |
| | | 2-MTA | (Part) | — | — | — | — | — |
| | | TA | (Part) | — | — | — | — | — |
| | | STA | (Part) | — | — | — | — | — |
| | Polyfunctional monomer | HDDA | (Part) | 19.9 | 19.9 | 19.9 | 19.9 | 19.9 |
| | | DPGDA | (Part) | 20 | 20 | 20 | 20 | — |

TABLE 2-continued

|  |  |  |  |  |  |  |  |  |
|---|---|---|---|---|---|---|---|---|
|  |  | TMPTA | (Part) | — | — | — | — | 50 |
|  |  | PE-3A | (Part) | 30 | 30 | 30 | 30 | — |
|  |  | DPHA | (Part) | — | — | — | — | — |
|  |  | PETA | (Part) | — | — | — | — | — |
|  |  | EO-TMPTA | (Part) | — | — | — | — | — |
|  |  | PO-NPA | (Part) | — | — | — | — | — |
|  | Oligomer | ACTILANE251 | (Part) | — | — | — | — | — |
|  | Polyfunctional monomer/monofunctional monomer |  |  | 5.6 | 5.6 | 5.6 | 5.6 | 5.6 |
| Pohotopolymerization initiator | IR.907 | (Part) |  | 9 | 9 | 9 | 9 | 9 |
|  | IR.369 | (Part) |  | — | — | — | — | — |
|  | DETX-S | (Part) |  | 0.9 | 0.9 | 0.9 | 0.9 | 0.9 |
|  | IT-X | (Part) |  | — | — | — | — | — |
|  | IR.651 | (Part) |  | — | — | — | — | — |
| Surface conditioner | BYK-UV3570 | (Part) |  | 0.1 | 0.1 | 0.1 | 0.1 | 0.1 |
|  | TegoRad2100 | (Part) |  | — | — | — | — | — |
|  | TegoRad2200N | (Part) |  | — | — | — | — | — |
|  | KF-945 | (Part) |  | — | — | — | — | — |
|  | Emulgen 106 | (Part) |  | — | — | — | — | — |
| Antigelling agent | UV10 | (Part) |  | 0.1 | 0.1 | 0.1 | 0.1 | 0.1 |
|  | TIN400 | (Part) |  | — | — | — | — | — |
| Dispersant | BYK168 | (Part) |  | 4.5 | 4.5 | 4.5 | 4.5 | 4.5 |

| Ink composition |  |  |  | Example 6 | Example 7 | Example 8 | Example 9 | Example 10 |
|---|---|---|---|---|---|---|---|---|
| Coloring material |  | MA-8 | (Part) | — | — | — | 3 | — |
|  |  | LA2 | (Part) | 3 | — | — | — | 3 |
|  |  | RT343D | (Part) | — | 3 | — | — | — |
|  |  | P-BFS | (Part) | — | — | 3 | — | — |
| Polymerizable compound | Monofunctional monomer | IO-A | (Part) | 12.5 | 12.5 | 12.5 | 12.5 | 12.5 |
|  |  | 2-MTA | (Part) | — | — | — | — | — |
|  |  | TA | (Part) | — | — | — | — | — |
|  |  | STA | (Part) | — | — | — | — | — |
|  | Polyfunctional monomer | HDDA | (Part) | 19.9 | 19.9 | 19.9 | 19.9 | 19.9 |
|  |  | DPGDA | (Part) | — | — | — | 20 | 20 |
|  |  | TMPTA | (Part) | 50 | 50 | 50 | — | — |
|  |  | PE-3A | (Part) | — | — | — | 30 | 30 |
|  |  | DPHA | (Part) | — | — | — | — | — |
|  |  | PETA | (Part) | — | — | — | — | — |
|  |  | EO-TMPTA | (Part) | — | — | — | — | — |
|  |  | PO-NPA | (Part) | — | — | — | — | — |
|  | Oligomer | ACTILANE251 | (Part) | — | — | — | — | — |
|  | Polyfunctional monomer/monofunctional monomer |  |  | 5.6 | 5.6 | 5.6 | 5.6 | 5.6 |
| Pohotopolymerization initiator | IR.907 | (Part) |  | 9 | 9 | 9 | 9 | 9 |
|  | IR.369 | (Part) |  | — | — | — | — | — |
|  | DETX-S | (Part) |  | 0.9 | 0.9 | 0.9 | 0.9 | 0.9 |
|  | IT-X | (Part) |  | — | — | — | — | — |
|  | IR.651 | (Part) |  | — | — | — | — | — |
| Surface conditioner | BYK-UV3570 | (Part) |  | 0.1 | 0.1 | 0.1 | — | — |
|  | TegoRad2100 | (Part) |  | — | — | — | 0.1 | 0.1 |
|  | TegoRad2200N | (Part) |  | — | — | — | — | — |
|  | KF-945 | (Part) |  | — | — | — | — | — |
|  | Emulgen 106 | (Part) |  | — | — | — | — | — |
| Antigelling agent | UV10 | (Part) |  | 0.1 | 0.1 | 0.1 | 0.1 | 0.1 |
|  | TIN400 | (Part) |  | — | — | — | — | — |
| Dispersant | BYK168 | (Part) |  | 4.5 | 4.5 | 4.5 | 4.5 | 4.5 |

TABLE 3

| Ink composition |  |  |  | Example 11 | Example 12 | Example 13 | Example 14 | Example 15 |
|---|---|---|---|---|---|---|---|---|
| Coloring material |  | MA-8 | (Part) | — | — | 3 | 3 | 3 |
|  |  | LA2 | (Part) | — | — | — | — | — |
|  |  | RT343D | (Part) | 3 | — | — | — | — |
|  |  | P-BFS | (Part) | — | 3 | — | — | — |
| Polymerizable compound | Monofunctional monomer | IO-A | (Part) | 12.5 | 12.5 | 12.5 | 12.5 | 12.5 |
|  |  | 2-MTA | (Part) | — | — | — | — | — |
|  |  | TA | (Part) | — | — | — | — | — |
|  |  | STA | (Part) | — | — | — | — | — |
|  | Polyfunctional monomer | HDDA | (Part) | 19.9 | 19.9 | 19.9 | 19.9 | 19.9 |
|  |  | DPGDA | (Part) | 20 | 20 | 20 | 20 | 20 |
|  |  | TMPTA | (Part) | — | — | — | — | — |
|  |  | PE-3A | (Part) | 30 | 30 | 30 | 30 | 30 |
|  |  | DPHA | (Part) | — | — | — | — | — |
|  |  | PETA | (Part) | — | — | — | — | — |
|  |  | EO-TMPTA | (Part) | — | — | — | — | — |

TABLE 3-continued

|  |  |  |  |  |  |  |  |
|---|---|---|---|---|---|---|---|
|  |  | PO-NPA | (Part) | — | — | — | — | — |
|  | Oligomer | ACTILANE251 | (Part) | — | — | — | — | — |
|  | Polyfunctional monomer/monofunctional monomer |  |  | 5.6 | 5.6 | 5.6 | 5.6 | 5.6 |
| Pohotopolymerization initiator | IR.907 |  | (Part) | 9 | 9 | 9 | 9 | — |
|  | IR.369 |  | (Part) | — | — | — | — | 9 |
|  | DETX-S |  | (Part) | 0.9 | 0.9 | 0.9 | 0.9 | 0.9 |
|  | IT-X |  | (Part) | — | — | — | — | — |
|  | IR.651 |  | (Part) | — | — | — | — | — |
| Surface conditioner | BYK-UV3570 |  | (Part) | — | — | — | — | 0.1 |
|  | TegoRad2100 |  | (Part) | 0.1 | 0.1 | — | — | — |
|  | TegoRad2200N |  | (Part) | — | — | 0.1 | — | — |
|  | KF-945 |  | (Part) | — | — | — | 0.1 | — |
|  | Emulgen 106 |  | (Part) | — | — | — | — | — |
| Antigelling agent | UV10 |  | (Part) | 0.1 | 0.1 | 0.1 | 0.1 | 0.1 |
|  | TIN400 |  | (Part) | — | — | — | — | — |
| Dispersant | BYK168 |  | (Part) | 4.5 | 4.5 | 4.5 | 4.5 | 4.5 |

| Ink composition |  |  |  | Example 16 | Example 17 | Example 18 | Example 19 | Example 20 |
|---|---|---|---|---|---|---|---|---|
| Coloring material |  | MA-8 | (Part) | 3 | 3 | 3 | 3 | 3 |
|  |  | LA2 | (Part) | — | — | — | — | — |
|  |  | RT343D | (Part) | — | — | — | — | — |
|  |  | P-BFS | (Part) | — | — | — | — | — |
| Polymerizable compound | Monofunctional monomer | IO-A | (Part) | 12.5 | 12.5 | 12.5 | 12.5 | 12.5 |
|  |  | 2-MTA | (Part) | — | — | — | — | — |
|  |  | TA | (Part) | — | — | — | — | — |
|  |  | STA | (Part) | — | — | — | — | — |
|  | Polyfunctional monomer | HDDA | (Part) | 19.9 | 19.9 | — | 14.9 | 19.9 |
|  |  | DPGDA | (Part) | 20 | 20 | 59.9 | 13 | 17.5 |
|  |  | TMPTA | (Part) | — | — | — | — | — |
|  |  | PE-3A | (Part) | 30 | 30 | — | 30 | 30 |
|  |  | DPHA | (Part) | — | — | 10 | — | — |
|  |  | PETA | (Part) | — | — | — | — | — |
|  |  | EO-TMPTA | (Part) | — | — | — | — | — |
|  |  | PO-NPA | (Part) | — | — | — | — | — |
|  | Oligomer | ACTILANE251 | (Part) | — | — | — | — | — |
|  | Polyfunctional monomer/monofunctional monomer |  |  | 5.6 | 5.6 | 5.6 | 4.6 | 5.4 |
| Pohotopolymerization initiator | IR.907 |  | (Part) | 7 | — | 9 | 20 | 9 |
|  | IR.369 |  | (Part) | — | 9 | — | — | — |
|  | DETX-S |  | (Part) | 0.9 | — | 0.9 | 1.9 | 1 |
|  | IT-X |  | (Part) | — | 0.9 | — | — | — |
|  | IR.651 |  | (Part) | 2 | — | — | — | — |
| Surface conditioner | BYK-UV3570 |  | (Part) | 0.1 | 0.1 | 0.1 | 0.1 | 2.5 |
|  | TegoRad2100 |  | (Part) | — | — | — | — | — |
|  | TegoRad2200N |  | (Part) | — | — | — | — | — |
|  | KF-945 |  | (Part) | — | — | — | — | — |
|  | Emulgen 106 |  | (Part) | — | — | — | — | — |
| Antigelling agent | UV10 |  | (Part) | 0.1 | 0.1 | 0.1 | 0.1 | 0.1 |
|  | TIN400 |  | (Part) | — | — | — | — | — |
| Dispersant | BYK168 |  | (Part) | 4.5 | 4.5 | 4.5 | 4.5 | 4.5 |

TABLE 4

| Ink composition |  |  |  | Example 21 | Example 22 | Example 23 | Example 24 | Example 25 |
|---|---|---|---|---|---|---|---|---|
| Coloring material |  | MA-8 | (Part) | 3 | 3 | 3 | 3 | 3 |
|  |  | LA2 | (Part) | — | — | — | — | — |
|  |  | RT343D | (Part) | — | — | — | — | — |
|  |  | P-BFS | (Part) | — | — | — | — | — |
| Polymerizable compound | Monofunctional monomer | IO-A | (Part) | 12.5 | 12.5 | 12.5 | 12.5 | 12.5 |
|  |  | 2-MTA | (Part) | — | — | — | — | — |
|  |  | TA | (Part) | — | — | — | — | — |
|  |  | STA | (Part) | — | — | — | — | — |
|  | Polyfunctional monomer | HDDA | (Part) | 19.9 | 19.9 | 24.9 | 19.2 | 19.9 |
|  |  | DPGDA | (Part) | 20 | 20 | 20 | 20 | 20 |
|  |  | TMPTA | (Part) | — | — | — | — | — |
|  |  | PE-3A | (Part) | — | — | — | 30 | 30 |
|  |  | DPHA | (Part) | — | — | 25 | — | — |
|  |  | PETA | (Part) | 30 | — | — | — | — |
|  |  | EO-TMPTA | (Part) | — | 30 | — | — | — |
|  |  | PO-NPA | (Part) | — | — | — | — | — |
|  | Oligomer | ACTILANE251 | (Part) | — | — | — | — | — |
|  | Polyfunctional monomer/monofunctional monomer |  |  | 5.6 | 5.6 | 5.6 | 5.5 | 5.6 |

TABLE 4-continued

| | | | | | | | |
|---|---|---|---|---|---|---|---|
| Pohotopolymerization initiator | IR.907 | (Part) | 9 | 9 | 9 | 9 | 9 |
| | IR.369 | (Part) | — | — | — | — | — |
| | DETX-S | (Part) | 0.9 | 0.9 | 0.9 | 0.9 | 0.9 |
| | IT-X | (Part) | — | — | — | — | — |
| | IR.651 | (Part) | — | — | — | — | — |
| Surface conditioner | BYK-UV3570 | (Part) | 0.1 | 0.1 | 0.1 | 0.1 | 0.1 |
| | TegoRad2100 | (Part) | — | — | — | — | — |
| | TegoRad2200N | (Part) | — | — | — | — | — |
| | KF-945 | (Part) | — | — | — | — | — |
| | Emulgen 106 | (Part) | — | — | — | — | — |
| Antigelling agent | UV10 | (Part) | 0.1 | 0.1 | 0.1 | — | — |
| | TIN400 | (Part) | — | — | — | 0.8 | — |
| Dispersant | BYK168 | (Part) | 4.5 | 4.5 | 4.5 | 4.5 | 4.5 |

| Ink composition | | | | Example 26 | Example 27 | Example 28 | Example 29 |
|---|---|---|---|---|---|---|---|
| Coloring material | | MA-8 | (Part) | 3 | 3 | 3 | 3 |
| | | LA2 | (Part) | — | — | — | — |
| | | RT343D | (Part) | — | — | — | — |
| | | P-BFS | (Part) | — | — | — | — |
| Polymerizable compound | Monofunctional monomer | IO-A | (Part) | 10 | 20 | — | — |
| | | 2-MTA | (Part) | — | — | 12.5 | — |
| | | TA | (Part) | — | — | — | 12.5 |
| | | STA | (Part) | — | — | — | — |
| | Polyfunctional monomer | HDDA | (Part) | 19.9 | 19.9 | 19.9 | 19.9 |
| | | DPGDA | (Part) | 22.5 | 12.5 | 20 | 20 |
| | | TMPTA | (Part) | — | — | — | — |
| | | PE-3A | (Part) | 30 | 30 | — | — |
| | | DPHA | (Part) | — | — | — | — |
| | | PETA | (Part) | — | — | 30 | 30 |
| | | EO-TMPTA | (Part) | — | — | — | — |
| | | PO-NPA | (Part) | — | — | — | — |
| | Oligomer | ACTILANE251 | (Part) | — | — | — | — |
| | Polyfunctional monomer/monofunctional monomer | | | 7.2 | 3.1 | 5.6 | 5.6 |
| Pohotopolymerization initiator | | IR.907 | (Part) | 9 | 9 | 9 | 9 |
| | | IR.369 | (Part) | — | — | — | — |
| | | DETX-S | (Part) | 0.9 | 0.9 | 0.9 | 0.9 |
| | | IT-X | (Part) | — | — | — | — |
| | | IR.651 | (Part) | — | — | — | — |
| Surface conditioner | | BYK-UV3570 | (Part) | 0.1 | 0.1 | 0.1 | 0.1 |
| | | TegoRad2100 | (Part) | — | — | — | — |
| | | TegoRad2200N | (Part) | — | — | — | — |
| | | KF-945 | (Part) | — | — | — | — |
| | | Emulgen 106 | (Part) | — | — | — | — |
| Antigelling agent | | UV10 | (Part) | 0.1 | 0.1 | 0.1 | 0.1 |
| | | TIN400 | (Part) | — | — | — | — |
| Dispersant | | BYK168 | (Part) | 4.5 | 4.5 | 4.5 | 4.5 |

TABLE 5

| Ink composition | | | | Comparative Example 1 | Comparative Example 2 | Comparative Example 3 | Comparative Example 4 | Comparative Example 5 |
|---|---|---|---|---|---|---|---|---|
| Coloring material | | MA-8 | (Part) | 3 | 3 | 3 | 3 | — |
| | | LA2 | (Part) | — | — | — | — | 3 |
| | | RT343D | (Part) | — | — | — | — | — |
| | | P-BFS | (Part) | — | — | — | — | — |
| Polymerizable compound | Monofunctional monomer | IO-A | (Part) | 12.5 | 12.5 | 12.5 | 12.5 | 12.5 |
| | | 2-MTA | (Part) | — | — | — | — | — |
| | | TA | (Part) | — | — | — | — | — |
| | | STA | (Part) | — | — | — | — | — |
| | Polyfunctional monomer | HDDA | (Part) | 19.9 | 19.9 | 19.9 | 19.9 | 19.9 |
| | | DPGDA | (Part) | 20 | 20 | 20 | 20 | 20 |
| | | TMPTA | (Part) | — | — | — | — | — |
| | | PE-3A | (Part) | — | — | 25 | 30 | 30 |
| | | DPHA | (Part) | — | — | — | — | — |
| | | PETA | (Part) | — | — | — | — | — |
| | | EO-TMPTA | (Part) | — | — | — | — | — |
| | | PO-NPA | (Part) | 30 | — | — | — | — |
| | Oligomer | ACTILANE251 | (Part) | — | 30 | 5 | — | — |
| | Polyfunctional monomer/monofunctional monomer | | | — | — | — | — | — |

TABLE 5-continued

| | | | | | | | |
|---|---|---|---|---|---|---|---|
| Pohotopolymerization initiator | IR.907 | (Part) | 9 | 9 | 9 | 9 | 9 |
| | IR.369 | (Part) | — | — | — | — | — |
| | DETX-S | (Part) | 0.9 | 0.9 | 0.9 | 0.9 | 0.9 |
| | IT-X | (Part) | — | — | — | — | — |
| | IR.651 | (Part) | — | — | — | — | — |
| Surface conditioner | BYK-UV3570 | (Part) | 0.1 | 0.1 | — | — | — |
| | TegoRad2100 | (Part) | — | — | — | — | — |
| | TegoRad2200N | (Part) | — | — | — | — | — |
| | KF-945 | (Part) | — | — | — | — | — |
| | Emulgen 106 | (Part) | — | — | — | — | — |
| Antigelling agent | UV10 | (Part) | 0.1 | 0.1 | 0.1 | 0.1 | 0.1 |
| | TIN400 | (Part) | — | — | — | — | — |
| Dispersant | BYK168 | (Part) | 4.5 | 4.5 | 4.5 | 4.5 | 4.5 |

| Ink composition | | | Comparative Example 6 | Comparative Example 7 | Comparative Example 8 | Comparative Example 9 | Comparative Example 10 |
|---|---|---|---|---|---|---|---|
| Coloring material | MA-8 | (Part) | — | — | 3 | 3 | 3 |
| | LA2 | (Part) | — | — | — | — | — |
| | RT343D | (Part) | 3 | — | — | — | — |
| | P-BFS | (Part) | — | 3 | — | — | — |
| Polymerizable compound | Monofunctional monomer | IO-A | (Part) | 12.5 | 12.5 | 12.5 | 12.5 | 12.5 |
| | | 2-MTA | (Part) | — | — | — | — | — |
| | | TA | (Part) | — | — | — | — | — |
| | | STA | (Part) | — | — | — | — | — |
| | Polyfunctional monomer | HDDA | (Part) | 19.9 | 19.9 | 14.9 | 19.9 | 19.9 |
| | | DPGDA | (Part) | 20 | 20 | 20 | 20 | 20 |
| | | TMPTA | (Part) | — | — | — | — | — |
| | | PE-3A | (Part) | 30 | 30 | 30 | 30 | 30 |
| | | DPHA | (Part) | — | — | — | — | — |
| | | PETA | (Part) | — | — | — | — | — |
| | | EO-TMPTA | (Part) | — | — | — | — | — |
| | | PO-NPA | (Part) | — | — | — | — | — |
| | Oligomer | ACTILANE251 | (Part) | — | — | — | — | — |
| | Polyfunctional monomer/monofunctional monomer | | | — | — | — | — | — |
| Pohotopolymerization initiator | IR.907 | (Part) | 9 | 9 | — | 9.5 | — |
| | IR.369 | (Part) | — | — | — | — | — |
| | DETX-S | (Part) | 0.9 | 0.9 | — | — | 9.5 |
| | IT-X | (Part) | — | — | — | — | — |
| | IR.651 | (Part) | — | — | 14.9 | — | — |
| Surface conditioner | BYK-UV3570 | (Part) | — | — | 0.1 | 0.1 | 0.1 |
| | TegoRad2100 | (Part) | — | — | — | — | — |
| | TegoRad2200N | (Part) | — | — | — | — | — |
| | KF-945 | (Part) | — | — | — | — | — |
| | Emulgen 106 | (Part) | — | — | — | — | — |
| Antigelling agent | UV10 | (Part) | 0.1 | 0.1 | 0.1 | 0.1 | 0.1 |
| | TIN400 | (Part) | — | — | — | — | — |
| Dispersant | BYK168 | (Part) | 4.5 | 4.5 | 4.5 | 4.5 | 4.5 |

TABLE 6

| Ink composition | | | Comparative Example 11 | Comparative Example 12 | Comparative Example 13 | Comparative Example 14 | Comparative Example 15 | Comparative Example 16 |
|---|---|---|---|---|---|---|---|---|
| Coloring material | MA-8 | (Part) | 3 | 3 | 3 | 3 | 3 | 3 |
| | LA2 | (Part) | — | — | — | — | — | — |
| | RT343D | (Part) | — | — | — | — | — | — |
| | P-BFS | (Part) | — | — | — | — | — | — |
| Polymerizable compound | Monofunctional monomer | IO-A | (Part) | 12.5 | 12.5 | 12.5 | 82 | — | — |
| | | 2-MTA | (Part) | — | — | — | — | — | — |
| | | TA | (Part) | — | — | — | — | — | — |
| | | STA | (Part) | — | — | — | — | — | 12.5 |
| | Polyfunctional monomer | HDDA | (Part) | 19.9 | 19.9 | 29.9 | — | 32.5 | 19.9 |
| | | DPGDA | (Part) | 20 | 20 | 40 | — | 20 | 20 |
| | | TMPTA | (Part) | — | — | — | — | — | — |
| | | PE-3A | (Part) | 30 | 30 | — | — | 30 | 30 |
| | | DPHA | (Part) | — | — | — | — | — | — |
| | | PETA | (Part) | — | — | — | — | — | — |
| | | EO-TMPTA | (Part) | — | — | — | — | — | — |
| | | PO-NPA | (Part) | — | — | — | — | — | — |
| | Oligomer | ACTILANE251 | (Part) | — | — | — | — | — | — |
| | Polyfunctional monomer/monofunctional monomer | | | — | — | — | — | — | — |

TABLE 6-continued

| Ink composition | | | Comparative Example 11 | Comparative Example 12 | Comparative Example 13 | Comparative Example 14 | Comparative Example 15 | Comparative Example 16 |
|---|---|---|---|---|---|---|---|---|
| Pohotopolymerization initiator | IR.907 | (Part) | — | 9 | 9.5 | 9 | 9 | 9 |
| | IR.369 | (Part) | — | — | — | — | — | — |
| | DETX-S | (Part) | 0.9 | 0.9 | — | 1 | 1 | 0.9 |
| | IT-X | (Part) | — | — | — | — | — | — |
| | IR.651 | (Part) | 9 | — | — | — | — | — |
| Surface conditioner | BYK-UV3570 | (Part) | 0.1 | — | 0.1 | 0.1 | 0.1 | 0.1 |
| | TegoRad2100 | (Part) | — | — | — | — | — | — |
| | TegoRad2200N | (Part) | — | — | — | — | — | — |
| | KF-945 | (Part) | — | — | — | — | — | — |
| | Emulgen 106 | (Part) | — | 0.1 | — | — | — | — |
| Antigelling agent | UV10 | (Part) | 0.1 | 0.1 | 0.1 | 0.1 | 0.1 | 0.1 |
| | TIN400 | (Part) | — | — | — | — | — | — |
| Dispersant | BYK168 | (Part) | 4.5 | 4.5 | 4.5 | 4.5 | 4.5 | 4.5 |

[Assessment]

Regarding the thus prepared ink compositions of examples and comparative examples prepared as described above, the viscosity, dispersion average particle diameter, surface tension and storage stability were measured as follows.

[Viscosity]

The viscosity was measured at 25° C. using an R100-type viscometer (manufactured by Toki Sangyo Co., Ltd.) under the condition of a rotation number of a cone of 20 rpm.

[Dispersion Average Particle Diameter]

The dispersion average particle diameter of pigment particles was measured using a particle size distribution measuring apparatus FPER-1000 (manufactured by Otsuka Electronics Co., Ltd.).

[Surface Tension]

The surface tension at 25° C. was measured using a fully automatic balance-type electro-surface tension meter ESB-V (manufactured by Kyowa Kagaku).

[Storage Stability]

An ink composition was stored under the condition of a temperature of 70° C. for 7 days, a change in the viscosity at that time was investigated, and storage stability was assessed according to the following criteria Good: Change in viscosity of less than 10%
Poor: Change in viscosity of 10% or more Then, regarding respective ink compositions of examples and comparative examples, the following discharge property test was performed, and the continuous discharge property was assessed.

[Continuous Discharge Property]

Using an ink jet recording apparatus equipped with a piezo-type ink jet nozzle (number of nozzles: 318), a discharge property test I in which an ink is continuously discharged for 60 minutes, and a discharge property test II in which 10 cycles are repeated, each cycle consisting of continuously discharging an ink for 20 minutes and, thereafter, making discharge of ink stand by for 10 minutes, were performed. Then, the frequency of occurrence of nozzle removal, satellite, flight bending, and an ink in the mist state upon each test were assessed according to the following criteria. This ink jet recording apparatus is provided with an ink tank, a supply pipe, a front chamber ink tank right before a piezo head, and the head as an ink supply system. In addition, the ink jet recording apparatus was driven at a driving frequency of 28 KHz so that an ink can be injected at a liquid droplet size of about 6 pl and a resolution of 1200×1200 dpi.

(Nozzle Removal)
  Good: Occurs in 1 to 5 nozzles
  Acceptable: Occurs in 6 to 19 nozzles
  Poor: Occurs in 20 or more nozzles
(Satellite)
  Good: Occurs in 1 to 5 nozzles
  Acceptable: Occurs in 6 to 19 nozzles
  Poor: Occurs in 20 or more nozzles
(Flight Bending)
  Good: Occurs in 1 to 5 nozzles
  AcceptableΔ: Occurs in 6 to 19 nozzles
  Poor: Occurs in 20 or more nozzles
(Ink in Mist State)
  Good: Occurs in 1 to 5 nozzles
  Acceptable: Occurs in 6 to 19 nozzles
  Poor: Occurs in 20 or more nozzles Then, regarding printed films which had been printed using respective ink compositions of examples and comparative examples, the curability and adherability were assessed as follows.

[Curability]

An ink composition was printed on a film made of polyethylene terephthalate (PET) with a bar coater to form printed films having a thickness of 2 μm (bar coater: #3) and a thickness of 15 μm (bar coater: #12), respectively. These printed films were irradiated with an ultraviolet ray at a total irradiation light quantity of 200 mJ/cm$^2$, using a metal halide lamp as an irradiation means to cure.

The thus cured printed films were touched with a finger and a nail, the presence or absence of attachment of the ink to the finger and the nail was observed visually, and curability was assessed according to the following criteria.

Good: No ink was attached to the finger or nail and, when rubbed with a nail, no flaw is generated on a printed film surface.

Acceptable: No ink was attached to the finger, but when rubbed with a nail, a flaw is generated on a printed film surface.

Poor: The ink was attached to the finger.

[Adherability]

An ink composition was printed onto films each made of polyvinyl chloride (PVC) or polyethylene terephthalate (PET) with a bar coater to form printed films having a thickness of 2 μm (bar coater: #3) and a thickness of 15 μm (bar coater: #12), respectively. These printed films were irradiated with an ultraviolet ray at a total irradiation light quantity of 200 mJ/cm$^2$, using a metal halide lamp as an irradiation means to cure.

The thus cured printed films were subjected to a grid test (1 mm square; 100 pieces) to confirm the peeled state with Sellotape (registered trade mark) according to JIS-K-5400. The number of peeled pieces in 100 was investigated, and adherability was assessed according to the following criteria.

Good: The number of peeled pieces of 10 or less in the grid test.

Acceptable: The number of peeled pieces of 11 to 20 in the grid test.

Poor: The number of peeled pieces of 21 or more in the grid test.

Tables 7 to 11 show the assessment results.

TABLE 7

|  |  |  | Example 1 | Example 2 | Example 3 | Example 4 | Example 5 |
|---|---|---|---|---|---|---|---|
| Viscosity (mPa · s) |  |  | 28.0 | 27.5 | 28.5 | 28.0 | 23.0 |
| Dispersion particle diameter (μm) |  |  | 90 | 140 | 125 | 120 | 90 |
| Surface tension (mN/m) |  |  | 30.5 | 30.5 | 30.5 | 30.5 | 29.8 |
| Storage stability |  |  | Good | Good | Good | Good | Good |
| Continuous discharge property | Test I | Nozzle removal | Good | Good | Good | Good | Good |
|  |  | Satellite | Acceptable | Good | Good | Good | Good |
|  |  | Flight bending | Good | Good | Acceptable | Good | Good |
|  |  | Mist state | Good | Good | Good | Good | Good |
|  | Test II | Nozzle removal | Good | Good | Good | Good | Good |
|  |  | Satellite | Acceptable | Good | Good | Good | Good |
|  |  | Flight bending | Good | Good | Acceptable | Good | Good |
|  |  | Mist state | Good | Good | Good | Good | Good |
| Curability |  | Thin film (2 μm) | Good | Good | Good | Good | Good |
|  |  | Thick film (15 μm) | Good | Good | Good | Good | Good |
| Adherability | PVC | Thin film (2 μm) | Good | Good | Good | Good | Good |
|  |  | Thick film (15 μm) | Good | Good | Good | Good | Good |
|  | PET | Thin film (2 μm) | Good | Good | Good | Good | Good |
|  |  | Thick film (15 μm) | Good | Good | Good | Good | Good |

|  |  |  | Example 6 | Example 7 | Example 8 | Example 9 | Example 10 |
|---|---|---|---|---|---|---|---|
| Viscosity (mPa · s) |  |  | 22.5 | 23.5 | 23.0 | 28.0 | 27.5 |
| Dispersion particle diameter (μm) |  |  | 140 | 125 | 120 | 90 | 140 |
| Surface tension (mN/m) |  |  | 29.8 | 29.5 | 29.8 | 31.0 | 30.2 |
| Storage stability |  |  | Good | Good | Good | Good | Good |
| Continuous discharge property | Test I | Nozzle removal | Good | Good | Good | Acceptable | Good |
|  |  | Satellite | Good | Good | Good | Good | Good |
|  |  | Flight bending | Good | Good | Good | Good | Good |
|  |  | Mist state | Good | Good | Good | Good | Good |
|  | Test II | Nozzle removal | Good | Good | Good | Good | Good |
|  |  | Satellite | Good | Good | Good | Good | Good |
|  |  | Flight bending | Good | Good | Good | Good | Good |
|  |  | Mist state | Good | Good | Good | Good | Good |
| Curability |  | Thin film (2 μm) | Good | Good | Good | Good | Good |
|  |  | Thick film (15 μm) | Good | Good | Good | Good | Good |
| Adherability | PVC | Thin film (2 μm) | Good | Good | Good | Good | Good |
|  |  | Thick film (15 μm) | Good | Good | Good | Good | Good |
|  | PET | Thin film (2 μm) | Good | Good | Good | Good | Good |
|  |  | Thick film (15 μm) | Good | Good | Good | Good | Good |

TABLE 8

|  |  |  | Example 11 | Example 12 | Example 13 | Example 14 | Example 15 |
|---|---|---|---|---|---|---|---|
| Viscosity (mPa · s) |  |  | 28.5 | 28.0 | 28.2 | 28.0 | 28.1 |
| Dispersion particle diameter (μm) |  |  | 125 | 120 | 90 | 90 | 90 |
| Surface tension (mN/m) |  |  | 29.8 | 30.6 | 30.4 | 29.8 | 31.0 |
| Storage stability |  |  | Good | Good | Good | Good | Good |
| Continuous discharge property | Test I | Nozzle removal | Good | Good | Good | Acceptable | Good |
|  |  | Satellite | Good | Good | Good | Acceptable | Good |
|  |  | Flight bending | Good | Good | Good | Good | Acceptable |
|  |  | Mist state | Good | Good | Good | Acceptable | Good |
|  | Test II | Nozzle removal | Good | Good | Good | Good | Good |
|  |  | Satellite | Good | Good | Good | Acceptable | Good |
|  |  | Flight bending | Good | Good | Acceptable | Good | Good |
|  |  | Mist state | Good | Good | Good | Good | Good |
| Curability |  | Thin film (2 μm) | Good | Good | Good | Good | Good |
|  |  | Thick film (15 μm) | Good | Good | Good | Good | Acceptable |
| Adherability | PVC | Thin film (2 μm) | Good | Good | Good | Good | Good |
|  |  | Thick film (15 μm) | Good | Good | Good | Acceptable | Good |
|  | PET | Thin film (2 μm) | Good | Good | Good | Good | Good |
|  |  | Thick film (15 μm) | Good | Good | Good | Acceptable | Good |

|  |  |  | Example 16 | Example 17 | Example 18 | Example 19 | Example 20 |
|---|---|---|---|---|---|---|---|
| Viscosity (mPa · s) |  |  | 28.0 | 28.2 | 15.2 | 30.5 | 28.5 |
| Dispersion particle diameter (μm) |  |  | 90 | 90 | 90 | 90 | 90 |
| Surface tension (mN/m) |  |  | 30.2 | 29.8 | 30.2 | 29.8 | 23.2 |
| Storage stability |  |  | Good | Good | Good | Good | Good |
| Continuous discharge property | Test I | Nozzle removal | Good | Good | Good | Good | Good |
|  |  | Satellite | Good | Good | Good | Good | Good |
|  |  | Flight bending | Good | Good | Good | Good | Acceptable |
|  |  | Mist state | Good | Good | Good | Good | Acceptable |
|  | Test II | Nozzle removal | Good | Good | Good | Good | Acceptable |
|  |  | Satellite | Good | Good | Good | Good | Good |

TABLE 8-continued

|  |  |  |  |  |  |  |  |
|---|---|---|---|---|---|---|---|
|  |  | Flight bending | Good | Good | Good | Good | Acceptable |
|  |  | Mist state | Good | Good | Good | Good | Acceptable |
| Curability |  | Thin film (2 μm) | Good | Good | Acceptable | Good | Good |
|  |  | Thick film (15 μm) | Good | Acceptable | Acceptable | Good | Good |
| Adherability | PVC | Thin film (2 μm) | Good | Good | Good | Acceptable | Good |
|  |  | Thick film (15 μm) | Good | Good | Good | Good | Acceptable |
|  | PET | Thin film (2 μm) | Good | Good | Good | Acceptable | Acceptable |
|  |  | Thick film (15 μm) | Good | Good | Good | Good | Acceptable |

TABLE 9

|  |  |  | Example 21 | Example 22 | Example 23 | Example 24 | Example 25 |
|---|---|---|---|---|---|---|---|
| Viscosity (mPa · s) |  |  | 32.4 | 27.6 | 29.2 | 29.5 | 29.0 |
| Dispersion particle diameter (μm) |  |  | 90 | 90 | 90 | 90 | 90 |
| Surface tension (mN/m) |  |  | 29.9 | 30.2 | 30.1 | 29.9 | 30.4 |
| Storage stability |  |  | Good | Good | Good | Good | Poor |
| Continuous discharge property | Test I | Nozzle removal | Good | Good | Good | Good | Good |
|  |  | Satellite | Good | Good | Good | Good | Good |
|  |  | Flight bending | Good | Good | Good | Good | Good |
|  |  | Mist state | Good | Good | Good | Good | Good |
|  | Test II | Nozzle removal | Good | Good | Good | Good | Good |
|  |  | Satellite | Good | Good | Good | Good | Good |
|  |  | Flight bending | Good | Good | Good | Good | Good |
|  |  | Mist state | Good | Acceptable | Good | Good | Good |
| Curability |  | Thin film (2 μm) | Good | Good | Good | Good | Good |
|  |  | Thick film (15 μm) | Good | Good | Good | Good | Good |
| Adherability | PVC | Thin film (2 μm) | Good | Good | Good | Good | Good |
|  |  | Thick film (15 μm) | Good | Good | Good | Good | Good |
|  | PET | Thin film (2 μm) | Good | Good | Good | Good | Good |
|  |  | Thick film (15 μm) | Good | Acceptable | Good | Good | Good |

|  |  |  | Example 26 | Example 27 | Example 28 | Example 29 |
|---|---|---|---|---|---|---|
| Viscosity (mPa · s) |  |  | 31.2 | 26.4 | 27.6 | 29.3 |
| Dispersion particle diameter (μm) |  |  | 90 | 90 | 90 | 90 |
| Surface tension (mN/m) |  |  | 30.1 | 30.4 | 30.6 | 30.5 |
| Storage stability |  |  | Good | Good | Good | Good |
| Continuous discharge property | Test I | Nozzle removal | Good | Good | Good | Good |
|  |  | Satellite | Acceptable | Acceptable | Acceptable | Acceptable |
|  |  | Flight bending | Good | Good | Good | Good |
|  |  | Mist state | Good | Good | Good | Good |
|  | Test II | Nozzle removal | Good | Good | Good | Good |
|  |  | Satellite | Acceptable | Acceptable | Acceptable | Acceptable |
|  |  | Flight bending | Good | Good | Good | Good |
|  |  | Mist state | Good | Good | Good | Good |
| Curability |  | Thin film (2 μm) | Good | Good | Good | Good |
|  |  | Thick film (15 μm) | Good | Good | Good | Good |
| Adherability | PVC | Thin film (2 μm) | Good | Good | Good | Good |
|  |  | Thick film (15 μm) | Good | Good | Good | Good |
|  | PET | Thin film (2 μm) | Good | Good | Good | Good |
|  |  | Thick film (15 μm) | Good | Good | Good | Good |

TABLE 10

|  |  |  | Comparative Example 1 | Comparative Example 2 | Comparative Example 3 | Comparative Example 4 | Comparative Example 5 |
|---|---|---|---|---|---|---|---|
| Viscosity (mPa · s) |  |  | 18.6 | 48.6 | 35.6 | 28.0 | 27.5 |
| Dispersion particle diameter (μm) |  |  | 90 | 90 | 90 | 90 | 140 |
| Surface tension (mN/m) |  |  | 30.3 | 30.0 | 35.4 | 34.5 | 33.8 |
| Storage stability |  |  | Good | Good | Good | Good | Good |
| Continuous discharge property | Test I | Nozzle removal | Good | Good | Good | Poor | Acceptable |
|  |  | Satellite | Good | Good | Acceptable | Good | Poor |
|  |  | Flight bending | Good | Good | Acceptable | Acceptable | Good |
|  |  | Mist state | Good | Acceptable | Acceptable | Good | Poor |
|  | Test II | Nozzle removal | Good | Good | Acceptable | Poor | Acceptable |
|  |  | Satellite | Good | Acceptable | Acceptable | Good | Poor |
|  |  | Flight bending | Good | Good | Acceptable | Acceptable | Good |
|  |  | Mist state | Acceptable | Poor | Poor | Good | Poor |
| Curability |  | Thin film (2 μm) | Acceptable | Good | Acceptable | Good | Good |
|  |  | Thick film (15 μm) | Poor | Poor | Acceptable | Good | Good |

TABLE 10-continued

| Adherability | PVC | Thin film (2 μm) | Good | Good | Acceptable | Good | Good |
|---|---|---|---|---|---|---|---|
| | | Thick film (15 μm) | Acceptable | Poor | Poor | Good | Good |
| | PET | Thin film (2 μm) | Acceptable | Good | Acceptable | Good | Good |
| | | Thick film (15 μm) | Poor | Poor | Acceptable | Good | Good |

| | | | Comparative Example 6 | Comparative Example 7 | Comparative Example 8 | Comparative Example 9 | Comparative Example 10 |
|---|---|---|---|---|---|---|---|
| Viscosity (mPa · s) | | | 28.5 | 28.0 | 27.5 | 28.5 | 28.0 |
| Dispersion particle diameter (μm) | | | 125 | 120 | 90 | 90 | 90 |
| Surface tension (mN/m) | | | 34.8 | 34.9 | 30.8 | 30.7 | 29.7 |
| Storage stability | | | Good | Good | Good | Good | Good |
| Continuous discharge property | Test I | Nozzle removal | Good | Good | Good | Good | Good |
| | | Satellite | Acceptable | Good | Good | Good | Good |
| | | Flight bending | Poor | Poor | Good | Good | Good |
| | | Mist state | Good | Acceptable | Good | Good | Good |
| | Test II | Nozzle removal | Good | Acceptable | Good | Good | Good |
| | | Satellite | Acceptable | Good | Good | Acceptable | Good |
| | | Flight bending | Poor | Poor | Good | Good | Good |
| | | Mist state | Good | Acceptable | Good | Good | Good |
| Curability | | Thin film (2 μm) | Good | Good | Acceptable | Acceptable | Acceptable |
| | | Thick film (15 μm) | Good | Good | Poor | Poor | Poor |
| Adherability | PVC | Thin film (2 μm) | Good | Good | Good | Good | Good |
| | | Thick film (15 μm) | Good | Good | Poor | Good | Poor |
| | PET | Thin film (2 μm) | Good | Good | Good | Good | Acceptable |
| | | Thick film (15 μm) | Good | Good | Poor | Poor | Poor |

TABLE 11

| | | | Comparative Example 11 | Comparative Example 12 | Comparative Example 13 | Comparative Example 14 | Comparative Example 15 | Comparative Example 16 |
|---|---|---|---|---|---|---|---|---|
| Viscosity (mPa · s) | | | 28.2 | 28.0 | 18.5 | 9.0 | 76.7 | 36.1 |
| Dispersion particle diameter (μm) | | | 90 | 90 | 90 | 90 | 90 | 90 |
| Surface tension (mN/m) | | | 30.5 | 34.9 | 30.4 | 29.8 | 30.9 | 30.6 |
| Storage stability | | | Good | Good | Good | Good | Poor | Good |
| Continuous discharge property | Test I | Nozzle removal | Good | Poor | Good | Good | Poor | Good |
| | | Satellite | Good | Acceptable | Good | Good | Poor | Good |
| | | Flight bending | Good | Good | Good | Good | Poor | Good |
| | | Mist state | Good | Acceptable | Good | Good | Poor | Poor |
| | Test II | Nozzle removal | Good | Acceptable | Good | Good | Poor | Good |
| | | Satellite | Good | Acceptable | Good | Good | Poor | Acceptable |
| | | Flight bending | Good | Good | Good | Good | Poor | Good |
| | | Mist state | Good | Good | Good | Good | Poor | Poor |
| Curability | | Thin film (2 μm) | Acceptable | Good | Acceptable | Poor | Good | Good |
| | | Thick film (15 μm) | Poor | Good | Poor | Poor | Good | Good |
| Adherability | PVC | Thin film (2 μm) | Good | Good | Poor | Poor | Good | Good |
| | | Thick film (15 μm) | Poor | Good | Acceptable | Poor | Good | Poor |
| | PET | Thin film (2 μm) | Good | Good | Poor | Poor | Good | Good |
| | | Thick film (15 μm) | Poor | Good | Poor | Poor | Good | Poor |

As shown in the tables, it is understood that the ink compositions of examples containing a monofunctional monomer having an acrylic equivalent of 300 or less, and having one ethylenic double bond in one molecule, and a polyfunctional monomer having an acrylic equivalent of 150 or less, and having two or more ethylenic double bonds in one molecule as a polymerizable compound, an α-aminoalkylphenone compound and a thioxanthone compound as a photopolymerization initiator, and a silicone compound having a polydimethylsiloxane structure as a surface conditioner have a viscosity of 15.2 to 32.4 mPa·s and a surface tension of 23.2 to 31.0 mN/m, have a low viscosity, and have a suitable surface tension for an ink jet recording system. For this reason, in the ink compositions of examples, occurrence of nozzle removal, satellite, flight bending, and ink discharge in the mist state are hardly seen, and the continuous discharge property is excellent. Particularly, it is understood that even the ink composition containing 10% by mass or more, further, 30 to 50% by mass of a higher polyfunctional monomer having three or more ethylenic double bonds has low viscosity, and has no problem in the continuous discharge property. In addition, it is understood that the ink compositions of examples, even when cured with low energy irradiation, have excellent curability and adherability in both of a thin film and a thick film. Furthermore, it is understood that the ink compositions of examples containing a hindered amine compound having a 2,2,6,6,-tetramethylpiperidinyl group as an antigelling agent have excellent storage stability.

To the contrary, it is understood that the ink compositions containing an oligomer as a polymerizable compound have a high viscosity, are poor in the continuous discharge property and, at the same time, are insufficient in curability and adherability (Comparative Examples 2 and 3). In addition, it is understood that in the ink composition containing only a monofunctional monomer as a polymerizable compound is poor in curability and adherability since reactivity is reduced (Comparative Example 14). Furthermore, it is understood that the ink composition containing only a polyfunctional monomer as a polymerizable compound has a high viscosity, and is poor in the continuous discharge property (Comparative Example 15). In addition, it is understood that even when a monofunctional monomer and a polyfunctional monomer are used as a polymerizable compound, the ink composition containing a polyfunctional monomer having a high acrylic equivalent has reduced curability and adherability, and the ink composition containing a monofunctional monomer having a high acrylic equivalent has a high viscosity, and is poor in the continuous discharge property and, at the same time, is poor in curability and adherability (Comparative Example 1 and Comparative Example 16). It is also understood that the ink compositions containing a monofunctional monomer and a polyfunctional monomer of a low acrylic equivalent as a polymerizable compound, but not containing, or containing only either one of an α-aminoalkylphenone compound and a thioxanthone compound as a photopolymerization initiator, are insufficient in curability and adherability (Comparative Examples 8 to 11 and 13). Furthermore, it is understood that the ink compositions not containing a silicone compound having a polydimethylsiloxane structure as a surface conditioner have a high surface tension, and are poor in the continuous discharge property (Comparative Examples 3 to 7 and 12).

The invention claimed is:

1. An energy ray-curable ink composition comprising a coloring agent, a polymerizable compound, a photopolymerization initiator and a surface conditioner, wherein the polymerizable compound consists only of a monofunctional monomer having an acrylic equivalent of 300 or less, and having one ethylenic double bond in one molecule, and a polyfunctional monomer having an acrylic equivalent of 150 or less, and having two or more ethylenic double bonds in one molecule, the photopolymerization initiator contains an α-aminoalkylphenone compound and a thioxanthone compound, the surface conditioner contains a silicone compound having a polydimethylsiloxane structure, the ink composition contains 10 to 20% by mass of the monofunctional monomer, 10 to 75% by mass of the polyfunctional monomer, 2 to 20% by mass of the α-aminoalkylphenone compound, 0.1 to 10% by mass of the thioxanthone compound, and 2.5% by mass or less of the silicone compound in the total amount of the ink composition, and a mass ratio of the content of the monofunctional monomer and the content of the polyfunctional monomer (polyfunctional monomer/monofunctional monomer) is 3 to 8.

2. The energy ray-curable ink composition according to claim 1, wherein the polymerizable compound contains a polyfunctional monomer having an acrylic equivalent of 150 or less, and having three or more ethylenic double bonds in one molecule, as the polyfunctional monomer, and the content of the polyfunctional monomer having an acrylic equivalent of 150 or less, and having three or more ethylenic double bonds in one molecule is 10 to 50% by mass in the total amount of the ink composition.

3. The energy ray-curable ink composition according to claim 1, wherein the polymerizable compound contains a polyfunctional monomer having an acrylic equivalent of 150 or less, and having two ethylenic double bonds in one molecule, and a polyfunctional monomer having an acrylic equivalent of 150 or less, and having three or more ethylenic double bonds in one molecule, as the polyfunctinal monomer, and the content of the polyfunctional monomer having an acrylic equivalent of 150 or less, and having two ethylenic double bonds in one molecule is 10 to 60% by mass, and the content of the polyfunctional monomer having an acrylic equivalent of 150 or less, and having three or more ethylenic double bonds in one molecule is 10 to 50% by mass, and the total content of these polyfunctional monomers is 20 to 75% by mass, in the total amount of the ink composition.

* * * * *